(12) United States Patent
Krippner et al.

(10) Patent No.: US 7,886,429 B2
(45) Date of Patent: Feb. 15, 2011

(54) METHOD FOR PRODUCING A MEASURING TRANSDUCER

(75) Inventors: Peter Krippner, Karlsruhe (DE); Fritz B. Prinz, Woodside, CA (US); Sangkyun Kang, Seoul (KR); Tibor Fabian, Mountain View, CA (US)

(73) Assignees: ABB AG, Mannheim (DE); Stanford University, Palo Alto, CA (US)

( * ) Notice: Subject to any disclaimer, the term of this patent is extended or adjusted under 35 U.S.C. 154(b) by 302 days.

(21) Appl. No.: 11/792,368

(22) PCT Filed: Dec. 8, 2004

(86) PCT No.: PCT/EP2004/013950

§ 371 (c)(1),
(2), (4) Date: Jun. 6, 2007

(87) PCT Pub. No.: WO2006/061036

PCT Pub. Date: Jun. 15, 2006

(65) Prior Publication Data

US 2008/0047127 A1    Feb. 28, 2008

(51) Int. Cl.
*H05K 3/20* (2006.01)
(52) U.S. Cl. .............................. 29/831; 29/830; 29/846; 29/847; 73/700; 73/756
(58) Field of Classification Search ............. 29/831, 29/846, 830, 847; 73/700–756
See application file for complete search history.

(56) References Cited

U.S. PATENT DOCUMENTS

| | | | |
|---|---|---|---|
| 3,748,571 A | 7/1973 | Kurtz | |
| 3,805,377 A | 4/1974 | Talmo et al. | |
| 4,510,671 A | 4/1985 | Kurtz et al. | |
| 4,565,096 A * | 1/1986 | Knecht | 73/718 |
| 4,672,354 A | 6/1987 | Kurtz et al. | |
| 4,732,647 A | 3/1988 | Aine | |
| 5,031,308 A * | 7/1991 | Yamashita et al. | 29/830 |
| 5,140,398 A * | 8/1992 | Matsuda et al. | 257/53 |
| 5,549,006 A | 8/1996 | Kurtz | |
| 6,021,675 A | 2/2000 | Seefeldt et al. | |
| 6,030,851 A | 2/2000 | Grandmont et al. | |
| 6,129,613 A | 10/2000 | Bothra | |
| 6,327,911 B1 | 12/2001 | Kurtz | |

(Continued)

FOREIGN PATENT DOCUMENTS

DE    40 31 369 A1    4/1992

(Continued)

OTHER PUBLICATIONS

International Preliminary Report on Patentability.

(Continued)

*Primary Examiner*—Derris H Banks
*Assistant Examiner*—Azm Parvez
(74) *Attorney, Agent, or Firm*—Buchanan Ingersoll & Rooney PC

(57) ABSTRACT

A method is provided for producing a measuring transducer in order to transform at least one physical variable into at least one electric variable. A plurality of planar, insulating and conductive layers are respectively structured according to predefineable models which are adapted to each other and which are assembled in order to form a multi-layered arrangement.

18 Claims, 4 Drawing Sheets

U.S. PATENT DOCUMENTS

Figure 1:
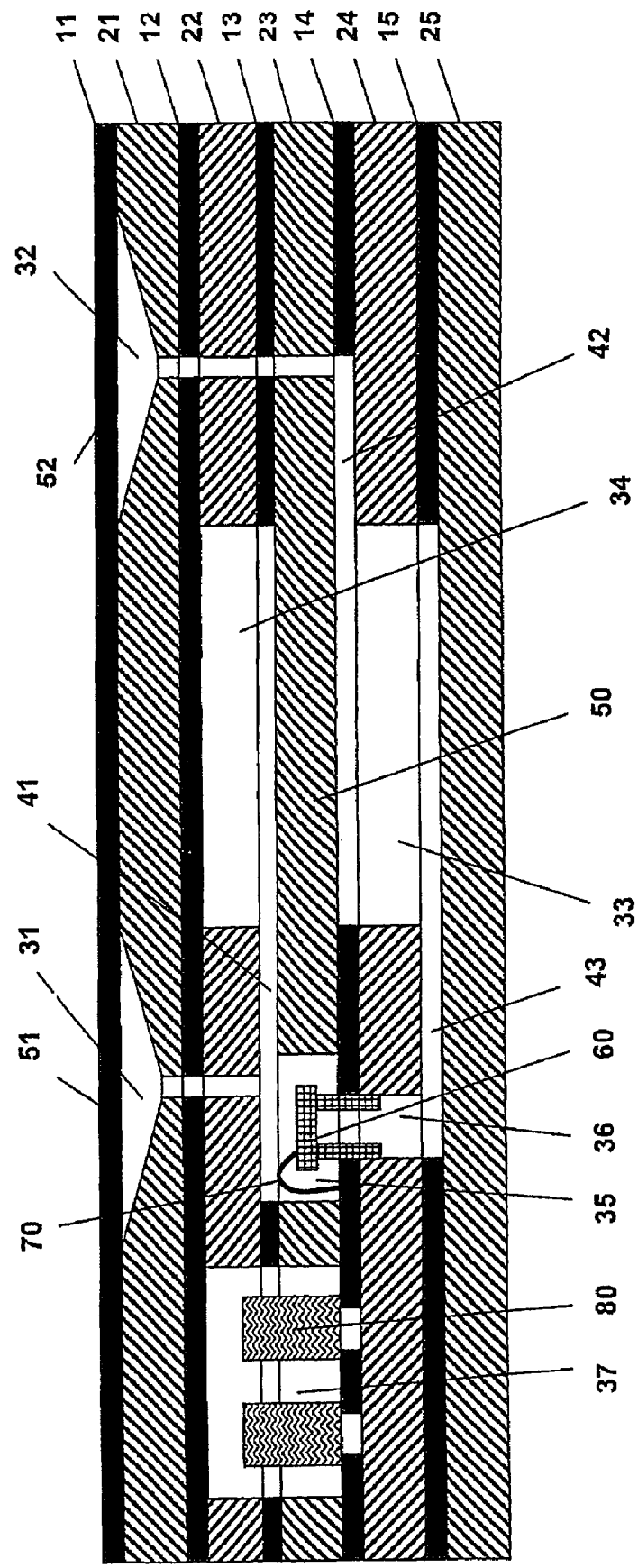

| | | |
|---|---|---|
| 6,604,425 B1 | 8/2003 | Hsu et al. |
| 6,797,367 B2 * | 9/2004 | Ogawa et al. ............... 428/209 |
| 2001/0020320 A1 | 9/2001 | McIntosh et al. |
| 2002/0029638 A1 | 3/2002 | Kurtz et al. |
| 2003/0072127 A1 | 4/2003 | Zias et al. |

FOREIGN PATENT DOCUMENTS

| | | |
|---|---|---|
| EP | 0 114 239 A2 | 8/1984 |
| EP | 0 229 553 A1 | 7/1987 |
| EP | 0 343 784 A2 | 11/1989 |
| FR | 2 629 592 A1 | 10/1989 |
| FR | 2 766 919 A1 | 2/1999 |
| GB | 2 064 873 A | 6/1981 |

OTHER PUBLICATIONS

PCT/ISA/210.

* cited by examiner

METHOD FOR PRODUCING A MEASURING TRANSDUCER

The invention relates to a method for producing a measuring transducer for converting at least one physical quantity into at least one electrical quantity.

Such measuring transducers for converting physical quantities such as pressure, temperature, flow rate or the like into an electrical quantities such as voltage, current or pulse sequence are known from prior use and relevant publications.

The known measuring transducers are characterized by an elaborate multi-part and specialized structure, which is produced by miscellaneous assembly technologies.

It is therefore an object of the invention to simplify the production of measuring transducers.

The invention is based on a measuring transducer having at least one sensor for converting at least one physical quantity into at least one electrical quantity.

The essence of the invention consists in a planar multi-layered arrangement consisting of insulating layers and conductive layers insulated from one another, which are respectively structured according to predetermined patterns matched to one another, and are assembled to form a multi-layered arrangement. Starting with a first layer, further layers are successively stacked on. Finally, the stack is assembled by pressure application.

This process is known in principle for producing multi-layered circuit boards as support elements for electronic components in printed circuits, but it has surprisingly been shown that the carrier material known per se is suitable as a functional element in a measuring transducer, so that the production process is reduced to a few technologically well-controlled steps.

According to one feature of the invention, the patterns are recessed into the insulating and/or conductive layers. In the case of patterns matched to one another in successive layers, recesses are thereby formed in which a sensor and electrical circuit elements can be fitted.

According to another feature of the invention, the patterns are impressed into the insulating and/or conductive layers. In this way, channels are formed through which a process medium can be fed to the sensor.

While the aforementioned patterning is based respectively on material removal and material displacement, according to another feature of the invention the patterns of the insulating and/or conductive layers are grown. In the context of this disclosure, this is intended to mean any form of pattern-forming material growth in a layer. In particular the layer thicknesses of interconnections, i.e. patterned conductive layers, are amplified in this way.

The starting point of the multi-layered arrangement is a circuit board known per se, consisting of a supporting insulator layer and at least one conductive layer structured in the form of interconnections according to predetermined patterns. This circuit board is equipped with one or more sensor elements and further electrical circuit elements, as a function of the type of measuring transducer. The electrical connection between the electrical circuit elements and the sensor elements is formed by at least one patterned conductive layer.

The circuit board consists of a resin-impregnated support material, which is coated on one or both sides with a copper foil. As a function of the type of electrical circuit elements and sensor elements, they are connected suitably to the patterned copper foil. This includes in particular, but not exclusively, soldering and bonding.

Further equivalent insulating layers and conductive layers insulated from one another are stacked on at least one side of this circuit board. The successive layers are assembled together with the interposition of an adhesion promoter and by pressure application. In particular but not exclusively, so-called prepregs i.e. composite films consisting of a support material and a hot-curing epoxy resin as binder, are provided as a bonding agent.

According to one feature of the invention, as a function of the type of measuring transducer, at least one measuring transducer-specific equipment element is inserted between two successive assembly steps. These include in particular, but not exclusively, capillaries for filling the sensor space with a measuring transducer-specific medium.

These measures lead to a measuring transducer which is made according to a uniform production process by employing technologically simple, technically introduced processes.

Advantageously, the constituents of the package of the sensor and of the electrical circuit elements, the support elements for the electrical circuit elements including the electrical connection means as well as the measuring transducer-specific equipment elements, are made from the same material combination and are assembled according to a uniform method.

Supporting and functional elements are particularly advantageously combined in the same component. This component is produced by a technologically undemanding process known per se.

Figure 2:
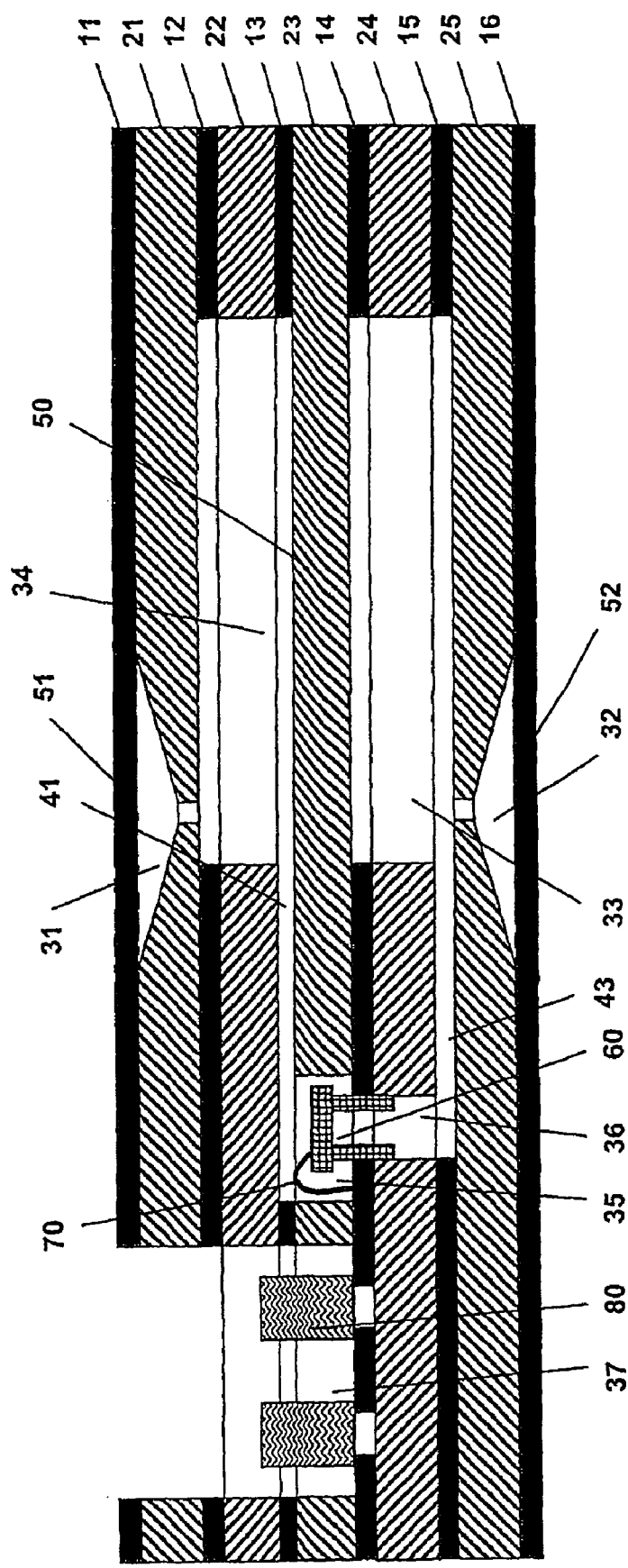
Figure 3:
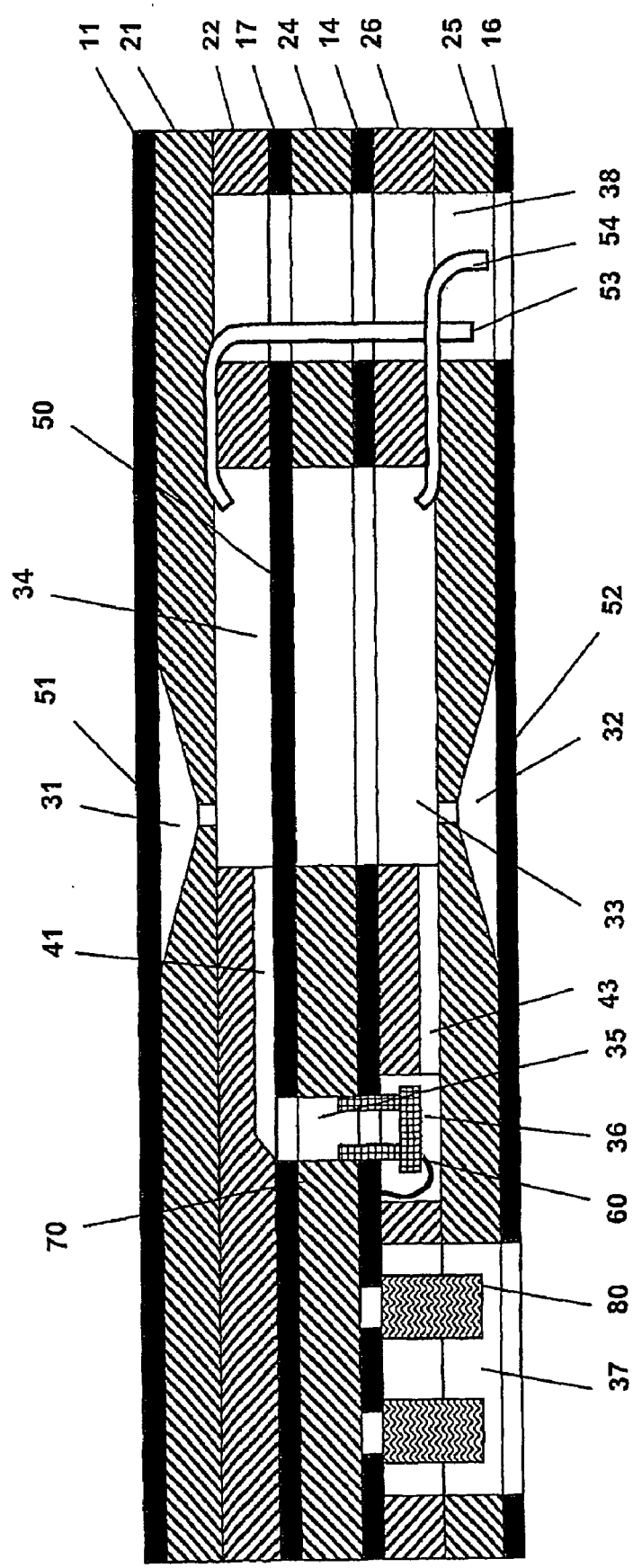
Figure 4:
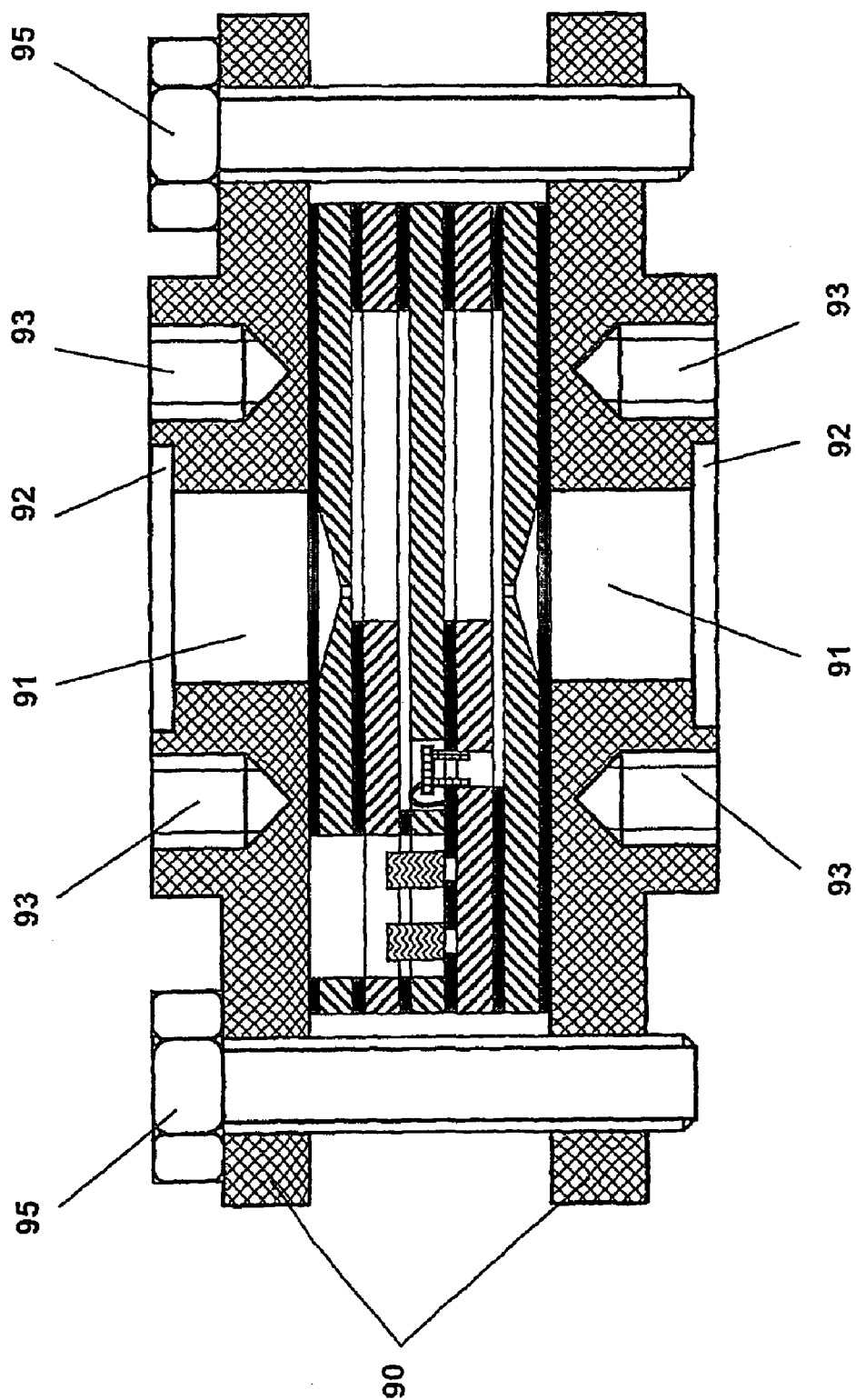

Other details and advantages of the invention will be explained in more detail below with reference to the example of a differential pressure measuring transducer unit in several embodiments. In the requisite drawings:

FIG. 1 shows a sectional representation of a first embodiment of a differential pressure measuring transducer unit FIG. 2 shows a sectional representation of a second embodiment of a differential pressure measuring transducer unit FIG. 3 shows a sectional representation of a third embodiment of a differential pressure measuring transducer unit FIG. 4 shows a sectional representation of a differential pressure measuring transducer FIG. 1 shows a sectional representation of the essential constituents of a differential pressure measuring transducer unit in a first embodiment. The differential pressure measuring transducer unit consists essentially of a stack of insulating layers 21 to 25 and conductive layers 11 to 15 insulated from one another, which partially comprise recesses 31 to 37 patterned to match one another and overlapping one another, into which a sensor 60 and further electrical circuit elements, such as measured value processing means, 80 are fitted.

In this embodiment, the insulating layer 21 comprises two identical funnel-shaped recesses 31 and 32. The outside of the insulating layer 21 is covered by the conductive layer 11, which is configured as a separating membrane 51 and 52 in the region of the recesses 31 and 32. The separating membranes 51 and 52 are preferably embossed in the form of concentric corrugated pattern known per se. The process pressures act on the other side of the separating membranes 51 and 52 from the insulating layer 21.

The insulating layers 22 and 24 separated from one another by the insulating layer 23 are patterned to match one another and comprise congruent recesses 33 and 34. In the overlap region of the recesses 33 and 34, the insulating layer 23 is configured as a membrane 50. The recess 33 is connected to the funnel-shaped recess 32 via a channel 42. The recess 34 is connected to the funnel-shaped recess 31 via a channel 41.

The insulating layers 23 and 24 as well as the conductive layer 14 furthermore comprise partially overlapping recesses 35 and 36, into which the sensor 60 is fitted. The sensor 60 is connected pressure-tightly to the insulating layer 24. The conductive layer 14 is patterned with openings. The sensor 60 comprises electrical terminals, which are connected via bonding connections 70 to various patterns of the conductive layer 14. The recess 35 is connected via the aforementioned channel 41 to the funnel-shaped recess 31 and the recess 34. The recess 36 is connected via a channel 43 to the recess 33 and in continuation via the channel 42 to the funnel-shaped recess 32.

The channels 41 to 43 are configured as recesses of the conductive layers 13 and 14 arranged between the insulating layers 22, 23 and 24.

The membrane 50 and the recesses 33 and 34 constitute the overload system of the differential pressure measuring transducer unit. The difference in the process pressure acting on the separating membranes 51 and 52 deflects the separating membranes 51 and 52 while increasing or decreasing the free volumes of the recesses 33 and 34. The volume difference is equalized via the channels 41 to 43 into the sensor chambers 35 and 36 and the recesses 33 and 34. In the event of an overload, the membrane 50 is deflected pressure-dependently.

The insulating layers 22 and 23 as well as the conductive layer 13 furthermore comprise overlapping recesses 37, into which the measured value processing means 80 are fitted. In this embodiment, the recess 37 is closed on all sides so that the measured value processing means 80 are embedded while being protected against mechanical damage. The measured value processing means 80 are electrically and mechanically connected to track-shaped patterns of the conductive layer 14.

The conductive layers 12 and 15, arranged between the insulating layers 21 and 22 as well as 24 and 25, are designed as shielding surfaces for shielding the sensor 60 and the measured value processing means 80 from electromagnetic radiation.

In particular, it is proposed that the conductive layers 12 to 15 should consist of copper and the insulating layers 21 to 25 should consist of fiber-reinforced synthetic resin. For the conductive layer 11, stainless steel is preferred.

Starting with a base circuit board consisting of the insulating layer 24 and the conductive layer 14, during the production of the differential pressure measuring transducer unit, further insulating and conductive layers are applied according to the structure described above with the interposition of an adhesion promoter, and the entire stack is hot-pressed together.

In a preferred embodiment an adhesive film known per se, consisting of synthetic resin, is provided as the adhesion promoter. As an alternative, it may be proposed for the differential pressure measuring transducer unit to be constructed from a stack of synthetic resin plates covered with copper on both sides, and for solder to be provided as the adhesion promoter.

The recesses 31 to 36 as well as the channels 41 to 43 are filled with a substantially incompressible fluid, in particular silicone oil. The fluid is introduced into the cavities via capillaries 53 and 54 represented in FIG. 3. After filling, the capillaries 53 and 54 are closed pressure-tightly.

Using the same references for means which are the same, FIG. 2 shows a second embodiment of the differential pressure measuring transducer unit according to the invention. The differential pressure measuring transducer unit consists essentially of a stack of insulating layers 21 to 25 and conductive layers 11 to 16 insulated from one another, which partially comprise patterns matched to one another with overlapping recesses 31 to 37, into which a sensor 60 and measured value processing means 80 are fitted.

In this second embodiment, the insulating layers 21 and 25 respectively comprise a funnel-shaped recess 31 and 32 which lie symmetrically opposite. The outside of the insulating layer 21 is covered by the conductive layer 11 and the outside of the insulating layer 25 is covered by the conductive layer 16. In the region of the recesses 31 and 32, the conductive layers 11 and 16 are configured as a separating membrane 51 and 52. The separating membranes 51 and 52 are preferably embossed in the form of a concentric corrugated pattern known per se. The process pressures act on the other side of the separating membrane 51 from the insulating layer 21 and on the other side of the separating membrane 52 from the insulating layer 25.

The insulating layers 22 and 24 separated from one another by the insulating layer 23 comprise congruent recesses 33 and 34. In the overlap region of the recesses 33 and 34, the insulating layer 23 is configured as a membrane 50. The recess 33 is connected to the funnel-shaped recess 32. The recess 34 is connected to the funnel-shaped recess 31.

The insulating layers 23 and 24 as well as the conductive layer 14 furthermore comprise partially overlapping recesses 35 and 36, into which the sensor 60 is fitted. The sensor 60 is connected pressure-tightly to the insulating layer 24. The conductive layer 14 is patterned with openings. The sensor 60 comprises electrical terminals, which are connected via bonding connections 70 to various patterns of the conductive layer 14. The recess 35 is connected via a channel 41 to the recess 34 and in continuation to the funnel-shaped recesses 31. The recess 36 is connected via a channel 43 to the recess 33 and in continuation to the funnel-shaped recess 32.

The channels 41 and 43 are configured as recesses of the conductive layers 13 and 15 arranged between the insulating layers 22 and 23 as well as 24 and 25.

The membrane 50 and the recesses 33 and 34 constitute the overload system of the differential pressure measuring transducer unit. The difference in the process pressure acting on the separating membranes 51 and 52 deflects the separating membranes 51 and 52 while increasing or decreasing the free volumes of the recesses 33 and 34. The volume difference is equalized into the recesses 33 and 34 and via the channels 41 and 43 into the sensor chambers 35 and 36. In the event of an overload, the membrane 50 is deflected pressure-dependently.

The insulating layers 21, 22 and 23 as well as the conductive layers 11, 12 and 13 furthermore comprise overlapping recesses 37, into which the measured value processing means 80 are fitted. In this embodiment, the recess 37 is open on one side so that the measured value processing means 80 are accessible but still embedded while being substantially protected against mechanical damage. The measured value processing means 80 are electrically and mechanically connected to track-shaped patterns of the conductive layer 14.

The conductive layers 12 and 15, arranged between the insulating layers 21 and 22 as well as 24 and 25, are designed as shielding surfaces for shielding the sensor 60 and the measured value processing means 80 from electromagnetic radiation.

In particular, it is proposed that the conductive layers 12 to 15 should consist of copper and the insulating layers 21 to 25 should consist of fiber-reinforced synthetic resin. For the conductive layers 11 and 16, stainless steel is preferred.

Starting with a base circuit board consisting of the insulating layer 24 and the conductive layer 14, during the production of the differential pressure measuring transducer unit, further insulating and conductive layers are applied according to the structure described above with the interposition of an adhesion promoter, and the entire stack is hot-pressed together.

In a preferred embodiment an adhesive film known per se, consisting of synthetic resin, is provided as the adhesion promoter. As an alternative, it may be proposed for the differential pressure measuring transducer unit to be constructed from a stack of synthetic resin plates covered with copper on both sides, and for solder to be provided as the adhesion promoter.

The recesses 31 to 36 as well as the channels 41 to 43 are filled with a substantially incompressible fluid, in particular silicone oil. The fluid is introduced into the cavities via capillaries 53 and 54 represented in FIG. 3. After filling, the capillaries 53 and 54 are closed pressure-tightly.

Using the same references for means which are the same. FIG. 3 shows a third embodiment of the differential pressure measuring transducer unit according to the invention. The differential pressure measuring transducer unit in this third embodiment also consists essentially of a stack of insulating layers 21 to 26 and conductive layers 11 to 16 insulated from one another, which partially comprise patterns matched to one another with overlapping recesses 31 to 37, into which a sensor 60 and measured value processing means 80 are fitted.

In this third embodiment, the insulating layers 21 and 25 respectively comprise a funnel-shaped recess 31 and 32 which lie symmetrically opposite. The outside of the insulating layer 21 is covered by the conductive layer 11 and the outside of the insulating layer 25 is covered by the conductive layer 16. In the region of the recesses 31 and 32, the conductive layers 11 and 16 are configured as a separating membrane 51 and 52. The separating membranes 51 and 52 are preferably embossed in the form of a concentric corrugated pattern known per se. The process pressures act on the other side of the separating membrane 51 from the insulating layer 21 and on the other side of the separating membrane 52 from the insulating layer 25.

The insulating layers 22 and 24 separated from one another by the conductive layer 17, as well as the insulating layer 26 and the conductive layer 14, comprise congruent recesses 33 and 34. In the overlap region of the recesses 33 and 34, the conductive layer 17 is configured as a membrane 50. The recess 33 is connected to the funnel-shaped recess 32. The recess 34 is connected to the funnel-shaped recess 31.

The insulating layers 24 and 26 as well as the conductive layer 14 furthermore comprise partially overlapping recesses 35 and 36, into which the sensor 60 is fitted. The sensor 60 is connected pressure-tightly to the insulating layer 24. The conductive layer 14 is patterned with openings. The sensor 60 comprises electrical terminals, which are connected via bonding connections 70 to various patterns of the conductive layer 14. The recess 35 is connected via a channel 41 to the recess 34 and in continuation to the funnel-shaped recesses 31. The recess 36 is connected via a channel 43 to the recess 33 and in continuation to the funnel-shaped recess 32.

The channels 41 and 43 are configured as recesses in the insulating layers 22 and 26. The channel-forming recesses are preferably impressed into the insulating layers 22 and 26.

The membrane 50 and the recesses 33 and 34 constitute the overload system of the differential pressure measuring transducer unit. The difference in the process pressure acting on the separating membranes 51 and 52 deflects the separating membranes 51 and 52 while increasing or decreasing the free volumes of the recesses 33 and 34. The volume difference is equalized into the recesses 33 and 34 and via the channels 41 and 43 into the sensor chambers 35 and 36. In the event of an overload, the membrane 50 is deflected pressure-dependently.

The insulating layers 25 and 26 as well as the conductive layer 16 furthermore comprise overlapping recesses 37, into which the measured value processing means 80 are fitted. In this embodiment, the recess 37 is open on one side so that the measured value processing means 80 are accessible but still embedded while being substantially protected against mechanical damage. The measured value processing means 80 are electrically and mechanically connected to track-shaped patterns of the conductive layer 14.

The conductive layer 17, arranged between the insulating layers 22 and 24, is designed as a shielding surface for shielding the sensor 60 and the measured value processing means 80 from electromagnetic radiation.

A recess 38 is furthermore provided, which in this third embodiment is arranged congruently in the insulating layers 22 and 24 to 26 as well as in the conductive layers 14, 16 and 17. The ends of two capillaries 53 and 54, the opposite ends of which respectively extend into the recesses 33 and 34, are fitted as measuring transducer-specific equipment elements in this recess 38.

In particular, it is proposed that the conductive layers 14 and 17 should consist of copper and the insulating layers 21 to 26 should consist of fiber-reinforced synthetic resin. For the conductive layers 11 and 16, stainless steel is preferred.

Starting with a base circuit board consisting of the insulating layer 24 and the conductive layer 14, during the production of the differential pressure measuring transducer unit, further insulating and conductive layers are applied according to the structure described above with the interposition of an adhesion promoter, and the entire stack is hot-pressed together.

Irrespective of the embodiment, before the insulating layer 21 is applied, the capillary 53 is introduced so that the one tube end projects into the recess 34 and the other tube end projects into the recess 38. Before the insulating layer 25 is applied, the capillary 54 is introduced so that one tube end projects into the recess 33 and the other tube end projects into the recess 38.

In a preferred embodiment an adhesive film known per se, consisting of synthetic resin, is provided as the adhesion promoter.

The recesses 31 to 36 as well as the channels 41 and 43 are filled with a substantially incompressible fluid, in particular silicone oil. The fluid is introduced into the cavities via capillaries 53 and 54. After filling, the capillaries 53 and 54 are closed pressure-tightly.

Lastly, FIG. 4 shows a sectional representation of a differential pressure measuring transducer having a differential pressure measuring transducer unit according to FIG. 2. In this case, the differential pressure measuring transducer unit is clamped between two flange caps 90, which bear on the outer conductive layers 11 and 16.

Each flange cap 90 comprises a bore 91 whose opening that faces away from the differential pressure measuring transducer unit is equipped with a flange appendage 92. The bore 91 in the flange cap 90 is arranged in the region of the separating membranes 51 and 52 of the differential pressure measuring transducer unit. Each bore 91 in the flange cap 90 is assigned two threaded bores 93, which are configured as blind bores.

The flange caps 90 are screwed together by a multiplicity of bolts 95, which are distributed uniformly over the circumference of the differential pressure measuring transducer unit. To this end, one of the flange caps 90 comprises bores and the opposite flange cap 90 comprises corresponding threaded bores.

For correct use of the differential pressure measuring transducer, an impulse line is attached to each flange cap 90. The impulse lines respectively comprise a flange-like collar, which is held by means of a union plate in the flange appendage 92. The union plate is fastened on the flange cap 90 by screws, which engage into the threaded bores 93.

LIST OF REFERENCES

11 to 17 conductive layer
21 to 26 insulating layer
31 to 38 recess
41 to 43 channel
50 membrane
51, 52 separating membrane
53, 54 capillary
60 sensor
70 bonding connection
80 measured value processing means
90 flange cap
91 bore
92 flange appendage
93 threaded bore
95 bolt

The invention claimed is:

1. A method for producing a measuring transducer configured to convert at least one physical quantity into at least one electrical quantity, the method comprising:
   structuring a multiplicity of planar insulating layers and conductive layers in an alternating order so that, in at least one pair of adjacent insulating and conductive layers among the structured layers, corresponding patterns respectively formed in each one of the adjacent insulating and conductive layers of the at least one pair are matched to one another when the adjacent insulating and conductive layers of the at least one pair are structured in the alternating order; and
   assembling the structured insulating layers and conductive layers to form a multi-layered arrangement in which the corresponding patterns respectively formed in each one of the adjacently structured insulating and conductive layers of the at least one pair are matched to one another while the adjacently structured insulating and conductive layers of the at least one pair are assembled in the alternating order in the multi-layered arrangement.

2. The method as claimed in claim 1, wherein the patterns are impressed into the insulating and/or conductive layers.

3. The method as claimed in claim 1, wherein the patterns are recessed into the insulating and/or conductive layers.

4. The method as claimed in claim 1, wherein the patterns of the insulating and/or conductive layers are grown.

5. The method as claimed in claim 1, wherein the insulating and/or conductive layers of the multi-layered arrangement are assembled together with the interposition of an adhesion promoter and by pressure application.

6. The method as claimed in claim 1, wherein the insulating and/or conductive layers of the multi-layered arrangement are assembled in a plurality of steps, at least one of the insulating and conductive layers being fitted with electrical circuit elements between two successive assembly steps.

7. The method as claimed in claim 6, wherein at least one measuring transducer-specific equipment element is inserted between two successive assembly steps.

8. The method as claimed in claim 4, wherein the insulating and/or conductive layers of the multi-layered arrangement are assembled together with the interposition of an adhesion promoter and by pressure application.

9. The method as claimed in claim 5, wherein the insulating and/or conductive layers of the multi-layered arrangement are assembled in a plurality of steps, at least one of the insulating and conductive layers being fitted with electrical circuit elements between two successive assembly steps.

10. A method for producing a measuring transducer, comprising:
    arranging a plurality of planar insulating layers and conductive layers in an alternating order so that, in at least one pair of adjacent insulating and conductive layers among the arranged layers, corresponding patterns respectively formed in each one of the adjacent insulating and conductive layers of the at least one pair are matched to one another when the adjacent insulating and conductive layers of the at least one pair are arranged in the alternating order; and
    forming a measuring transducer based on a multi-layered arrangement of the plurality of planar insulating and conductive layers, in which the corresponding patterns respectively formed in each one of the adjacently arranged insulating and conductive layers of the at least one pair are matched to one another while the adjacently arranged insulating and conductive layers of the at least one pair are arranged in the alternating order in the multi-layered arrangement,
    wherein the measuring transducer is capable of converting at least one physical quantity into at least one electrical quantity.

11. The method as claimed in claim 10, wherein the patterns are impressed into the insulating and/or conductive layers.

12. The method as claimed in claim 10, wherein the patterns are recessed into the insulating and/or conductive layers.

13. The method as claimed in claim 10, wherein the patterns of the insulating and/or conductive layers are grown.

14. The method as claimed in claim 10, wherein the insulating and/or conductive layers of the multi-layered arrangement are assembled together with the interposition of an adhesion promoter and by pressure application.

15. The method as claimed in claim 10, wherein the insulating and/or conductive layers of the multi-layered arrangement are assembled in a plurality of steps, at least one of the insulating and conductive layers being fitted with electrical circuit elements between two successive assembly steps.

16. The method as claimed in claim 15, wherein at least one measuring transducer-specific equipment element is inserted between two successive assembly steps.

17. The method as claimed in claim 13, wherein the insulating and/or conductive layers of the multi-layered arrangement are assembled together with the interposition of an adhesion promoter and by pressure application.

18. The method as claimed in claim 14, wherein the insulating and/or conductive layers of the multi-layered arrangement are assembled in a plurality of steps, at least one of the insulating and conductive layers being fitted with electrical circuit elements between two successive assembly steps.

* * * * *